(12) United States Patent
Brueck et al.

(10) Patent No.: US 8,955,311 B2
(45) Date of Patent: Feb. 17, 2015

(54) DEVICE FOR CONVEYING LIQUID REDUCING AGENT AND MOTOR VEHICLE HAVING THE DEVICE

(71) Applicant: Emitec Gesellschaft Fuer Emissionstechnologie mbH, Lohmar (DE)

(72) Inventors: Rolf Brueck, Bergisch Gladbach (DE); Jan Hodgson, Troisdorf (DE); Sven Schepers, Troisdorf (DE)

(73) Assignee: EMITEC Gesellschaft fuer Emissionstechnologie mbH, Lohmar (DE)

( * ) Notice: Subject to any disclaimer, the term of this patent is extended or adjusted under 35 U.S.C. 154(b) by 0 days.

(21) Appl. No.: 13/716,379

(22) Filed: Dec. 17, 2012

(65) Prior Publication Data
US 2013/0219869 A1    Aug. 29, 2013

Related U.S. Application Data

(63) Continuation of application No. PCT/EP2011/059428, filed on Jun. 8, 2011.

(30) Foreign Application Priority Data

Jun. 16, 2010   (DE) .......................... 10 2010 024 022

(51) Int. Cl.
*F01N 3/00*   (2006.01)
*F01N 3/02*   (2006.01)
*F01N 3/10*   (2006.01)
(Continued)

(52) U.S. Cl.
CPC ................ *F01N 3/08* (2013.01); *F01N 3/2066* (2013.01); *F01N 2610/10* (2013.01); *F01N 2610/1406* (2013.01); *Y02T 10/24* (2013.01)
USPC .................. 60/295; 60/286; 60/299; 60/301; 137/206; 137/207.5; 137/558

(58) Field of Classification Search
USPC ......... 60/286, 295, 299, 301; 137/206, 207.5, 137/558; 222/318
See application file for complete search history.

(56) References Cited

U.S. PATENT DOCUMENTS

| | | | | |
|---|---|---|---|---|
| 7,644,579 | B2 * | 1/2010 | Roberts et al. ................... | 60/286 |
| 7,836,684 | B2 * | 11/2010 | Starck et al. ..................... | 60/286 |
| 7,895,829 | B2 * | 3/2011 | Suzuki et al. ................... | 60/286 |

(Continued)

FOREIGN PATENT DOCUMENTS

| | | |
|---|---|---|
| DE | 102004062603 B3 | 7/2006 |
| DE | 102005031510 A1 | 1/2007 |

(Continued)

OTHER PUBLICATIONS

International Search Report of PCT/EP2011/059428.

*Primary Examiner* — Audrey K Bradley
*Assistant Examiner* — Dapinder Singh
(74) *Attorney, Agent, or Firm* — Laurence A. Greenberg; Werner H. Stemer; Ralph E. Locher

(57) ABSTRACT

A device for conveying a liquid reducing agent from a tank to a supply element includes a connecting element for connecting a reducing agent line, a system heating unit and a heat-conducting structure configured to transport heat from the system heating unit to the connecting element. A motor vehicle having the device is also provided.

9 Claims, 3 Drawing Sheets

(51) Int. Cl.
*F01N 3/20* (2006.01)
*F01N 3/08* (2006.01)

(56) References Cited

U.S. PATENT DOCUMENTS

| | | | |
|---|---|---|---|
| 7,912,360 | B2 | 3/2011 | Gschwind |
| 2003/0213234 | A1* | 11/2003 | Funk et al. ...................... 60/286 |
| 2005/0252201 | A1* | 11/2005 | Lecea et al. ...................... 60/286 |
| 2007/0068525 | A1* | 3/2007 | Offenhuber et al. ..... 128/204.21 |
| 2007/0157602 | A1* | 7/2007 | Gschwind ........................ 60/274 |
| 2008/0092531 | A1* | 4/2008 | Suzuki et al. ................... 60/301 |
| 2009/0038296 | A1 | 2/2009 | Fukuda et al. |
| 2009/0078692 | A1 | 3/2009 | Starck |
| 2009/0100824 | A1* | 4/2009 | Starck et al. .................... 60/286 |
| 2009/0277156 | A1* | 11/2009 | Hodgson et al. ................. 60/274 |
| 2010/0154907 | A1* | 6/2010 | Lecea et al. ............... 137/565.29 |
| 2010/0162690 | A1* | 7/2010 | Hosaka et al. ................... 60/295 |
| 2011/0016852 | A1 | 1/2011 | Haeberer et al. |
| 2011/0056961 | A1 | 3/2011 | Amtmann et al. |

FOREIGN PATENT DOCUMENTS

| | | |
|---|---|---|
| DE | 10 205 046 029 A1 | 3/2007 |
| DE | 102006061736 A1 | 7/2008 |
| DE | 102008045958 A1 | 3/2010 |
| DE | 102009039567 A1 | 3/2011 |
| EP | 2 229 079 A1 | 3/2011 |
| WO | 2006/131201 A2 | 12/2006 |
| WO | 2007/017080 A1 | 2/2007 |

* cited by examiner

DEVICE FOR CONVEYING LIQUID REDUCING AGENT AND MOTOR VEHICLE HAVING THE DEVICE

CROSS-REFERENCE TO RELATED APPLICATION

This is a continuation, under 35 U.S.C. §120, of copending International Application No. PCT/EP2011/059428, filed Jun. 8, 2011 which designated the United States; this application also claims the priority, under 35 U.S.C. §119, of German Patent Application DE 10 2010 024 022.2, filed Jun. 16, 2010; the prior applications are herewith incorporated by reference in their entirety.

BACKGROUND OF THE INVENTION

Field of the Invention

The invention relates to a device for conveying liquid reducing agent from a tank to a supply element for delivery of the liquid reducing agent to an exhaust gas treatment device of an internal combustion engine. The invention also relates to a motor vehicle having the device.

Exhaust gas treatment devices in which a liquid reducing agent is supplied have been increasingly used in recent times to clean the exhaust emissions from mobile internal combustion engines. One frequently used method for cleaning the exhaust gas is the method of selective catalytic reduction (SCR). In that method a reducing agent, preferably ammonia, is used to reduce the nitrous oxide (NOx) compounds in the exhaust gas. The method of selective catalytic reduction is used, in particular, on lean-burn internal combustion engines (such as, for example, diesel engines). Such internal combustion engines typically have a high emission of nitrous oxide compounds.

In particular in mobile applications, the reducing agent (or ammonia) is not stored directly as such but in the form of a precursor. Such a precursor is, for example, urea or in particular a urea-water solution. Particularly frequently a 32.5% urea-water solution is used which is available commercially under the trademark AdBlue.

The problem of storing such a solution is that it freezes at temperatures below −11° C. Such low temperatures can occur, in particular, during longer stoppage periods of the motor vehicle. For that reason a device for conveying or delivering reducing agent must be constructed in such a way that it is able to rapidly thaw at least a starting volume of reducing agent so that operation of the exhaust gas treatment device is possible directly, even if frozen reducing agent is still present in the device.

Devices are also known for conveying liquid reducing agent which are disposed directly on a tank for the liquid reducing agent and which are connected to a heatable line through which the reducing agent can be conveyed from the device to the exhaust gas system through the supply element. It has been found that, in particular, the connection of the delivery device for the line freezes especially easily. Thermal insulation is difficult to provide there so that the reducing agent normally freezes in that region first. At the same time it is precisely that region which must be free from ice so that after start-up of the combustion engine and the device according to the invention, a reliable delivery of reducing agent can take place.

SUMMARY OF THE INVENTION

It is accordingly an object of the invention to provide a device for conveying liquid reducing agent and a motor vehicle having the device, which overcome the hereinaforementioned disadvantages and at least partly solve the outlined problems of the heretofore-known devices and vehicles of this general type. In particular, the device should be able to be brought into operation particularly quickly and reliably when frozen reducing agent is present inside the device and at the same time be particularly economical in that, for example, no additional electrical heating system is required.

With the foregoing and other objects in view there is provided, in accordance with the invention, a device for conveying liquid reducing agent from a tank to a supply element. The device comprises at least one connecting element for connection of a reducing agent line, a system heating unit and a heat-conductive structure configured to transport heat from the system heating unit to the at least one connecting element.

The device for conveying liquid reducing agent in particular has a delivery pump which can convey liquid reducing agent from a tank as required and deliver it at a defined pressure.

In addition, one or more filter elements can be provided in the device for filtering the reducing agent so that contaminants and particles in the reducing agent do not enter the delivery device, the pump or the supply element. The device regularly defines a flow direction of the reducing agent from the tank to the connecting element. According to the configuration preferred herein, first a coarse filter and then a fine filter are disposed before the pump in the flow direction.

In addition, various sensors can be provided in the device for monitoring the reducing agent. These can, for example, be pressure sensors, temperature sensors, mass flow sensors and/or quality sensors and combinations of these sensors.

Furthermore, at least one valve can be provided in the device. A valve can e.g. be constructed as a return valve which is located in a return line for reducing agent from the device back to the tank. The return line typically branches off a delivery line of the device after the pump in the flow direction.

The supply element typically includes an injector through which the reducing agent can be supplied to an exhaust gas treatment device in a defined manner. The quantity of reducing agent supplied by the supply element to the exhaust gas treatment device can be defined in this case precisely through a pressure present at the injector, the geometry of the injector and/or the opening time of the injector.

The connecting element which is disposed on the device for connection of a reducing agent line can be constructed as a coupling or as a connecting pipe, with which the reducing agent line can be mounted there fluid-tightly. The connecting pipe can, for example, be constructed with a smooth surface and/or with a corrugated surface so that the reducing agent line lies fluid-tightly against the connecting pipe or surrounds it fluid-tightly.

The reducing agent line can be constructed so as to be heatable. For example, the reducing agent line can be a (flexible) hose in which heating wires are embedded. It is also possible for the reducing agent line to be constructed in the manner of a rigid line (e.g. as a pipe). The reducing agent line does not usually cover the connecting element completely so that the connecting element is regularly exposed directly to the temperatures which are present.

Therefore, in the device according to the invention a heat-conductive structure is provided which transports the heat from a system heating unit of the device according to the invention to the connecting element. The heat-conductive structure is typically constructed as a metal block with a high thermal conductivity. A particularly preferred material for the heat-conductive structure is steel, in particular stainless steel or aluminum. Aluminum is distinguished by a particularly advantageous ratio of weight and thermal capacity with respect to thermal conductivity.

The system heating unit is preferably constructed as a PTC heating element (PTC=positive temperature coefficient) which converts electrical current into heat, wherein the heating power of the PTC heating element is reduced automatically in case of temperatures above a threshold temperature. It is also preferred that the system heating be integrated in a functional component of the device for conveying reducing agent (such as e.g. in an assembly with the pump and/or filter) so that the system heating unit is integrated, for example, in the housing of one of those components. The heating power of such a system heating unit is preferably between 20 W [Watts] and 500 W [Watts], particularly preferably between 50 W [Watts] and 100 W [Watts].

Consequently, in this case, the system heating unit is not disposed directly on the connecting element but remote therefrom e.g. by at least 5 cm [centimeters] or even at least 10 cm [centimeters]. It is particularly preferred that the device for conveying reducing agent include only one (single) system heating unit which is not only allocated directly to a functional component but at the same time is in heat-conductive contact with the connecting element. This heat-conductive contact is formed, in particular, in such a way that a significant heat flow (in particular greater than in other regions) towards the connecting element can be determined, so that in the case of a frozen system, the frozen reducing agent is thawed, in particular in or on the connecting element e.g. after the functional component.

In accordance with another particularly advantageous feature of the device of the invention, the heat-conductive structure is adapted to transport at least 20% of the heating energy generated by the system heating unit to the connecting element. Particularly preferably, the heat-conductive structure is adapted to transport at least 40% and in particular at least 60% of the heating energy generated by the system heating unit to the connecting element. In order to guarantee such a transport rate of heating energy to the connecting element, the heat-conductive structure can be insulated from the environment in such a way that the heat flow from the system heating unit takes place preferably in the direction towards the connecting element, while the heat flow to other regions of the device according to the invention is hindered. This can be achieved, for example, by insulating materials which surround the heat-conductive structure in regions. It is also possible for the cross-section of the connections of the heat-conductive structure to the environment to be so small that only small amounts of heat are transported from the heat-conductive structure to the environment. The environment in this case means, in particular, the housing and/or other functional components of the device according to the invention.

In accordance with a further advantageous feature of the device of the invention, the heat-conductive structure has a thermal capacity of less than 500 J/K [Joules per Kelvin]. Preferably, the heat-conductive structure has a thermal capacity of less than 250 J/K [Joules per Kelvin] and particularly preferably less than 100 J/K [Joules per Kelvin]. On start-up of the device according to the invention, the system heating unit must first heat the heat-conductive structure before heat from the system heating unit reaches the connecting element. It is therefore advantageous if the thermal capacity of the heat-conductive structure is particularly low. At the same time the thermal conductivity of the heat-conductive structure from the system heating unit to the connecting element should be as high as possible.

In accordance with an added advantageous feature of the device of the invention, the heat-conductive structure from the system heating unit to the connecting element has a thermal conductivity of more than 10 W/K [Watts per Kelvin]. Preferably, the heat-conductive structure has a thermal conductivity of more than 15 W/K [Watts per Kelvin] and in particular more than 20 W/K [Watts per Kelvin] from the system heating unit to the connecting element. A thermal conductivity of 10 W/K [Watts per Kelvin] means that at a temperature difference of 1 K [Kelvin] between the system heating unit and the connecting element, a thermal energy quantity of 10 W [Watts] flows from the system heating unit to the connecting element.

In accordance with an additional advantageous feature of the device of the invention, the device has no further active heating system other than the system heating unit. A further active heating system in the device for conveying reducing agent regularly constitutes a substantial cost factor. In this case not only the costs for the heating element of the heating unit itself must be considered but also the energy consumption of the heating system during operation and the electronics necessary to control the heating system. The heat-conductive structure in the device according to the invention allows for an efficient distribution of heating energy from the system heating unit to the device according to the invention so that no additional active heating systems are required. It is self-evident that further external active heating systems (i.e. in particular ones which can be controlled or switched on and off independently according to need) can be present, affecting e.g. the tank or part of the external reducing agent lines. The individual system heating unit consequently affects, in particular, the portion from the tank extraction point to the connecting element so that it alone is responsible or independently adapted for thawing that location.

In accordance with yet another advantageous feature of the device of the invention, the heat-conductive structure has a heat flow direction from the system heating unit to the connecting element, and the heat-conductive structure has a continuously tapering cross section along the heat flow direction. Normally, heat losses towards the outside occur in the heat-conductive structure along the heat flow direction. For this reason the heat quantity transported by the heat-conductive structure from the system heating unit to the connecting element along the heat flow direction becomes ever smaller. It is therefore advantageous to adapt the heat-transporting cross section of the heat-conductive structure to the heat actually transported in the heat-conductive structure. Thus, the mass of the heat-conductive structure can be minimized at the same time as the thermal capacity of the heat-conductive structure is minimized. It should be noted in this case that the tapering of the cross section is constant (strictly continuous) and/or can take place in (small) steps or shoulders so that, in particular, no widening is provided towards the connection element.

In accordance with yet a further advantageous feature of the device of the invention, the heat-conductive structure includes at least one heat pipe. A heat pipe allows a very great transfer of heat over long distances even at low temperature differences. A heat pipe is a hollow body in which a fluid is present. The fluid is typically present partly in the gaseous phase and partly in the liquid phase and can transport heat. Consequently, the liquid fluid is evaporated close to and over the system heating unit, flows towards the opposite end of the heat pipe close to the connecting element and there emits the heat to the connecting element. Several heat pipes can also be provided in the heat-conductive structure in order to transport heat in a particularly efficient manner.

In accordance with yet an added feature of the device of the invention, the device has a housing and the heat-conductive structure is in heat-conductive connection with the housing through at least one heat bridge, wherein the at least one heat bridge is formed in such a way that a maximum heat flow of between 5 W [Watts] and 50 W [Watts] flows from the heat-conductive structure to the housing when frozen reducing agent is present at the housing.

The housing of a device according to the invention is preferably metallic. The housing is preferably at least partly disposed in a tank for the liquid reducing agent. This allows a particularly compact configuration of the device according to the invention because the device according to the invention does not then protrude beyond the tank and the tank can be adapted to the construction space available in a motor vehicle.

As already explained, the reducing agent can freeze in the tank. In order to ensure that no negative pressure forms in the tank which would hinder the extraction of liquid reducing agent from the tank, it is advantageous for a vent opening to be melted in an ice covering of frozen reducing agent present in the tank, through which the negative pressure can be compensated. Such a vent opening can, for example, also be created where an ice covering borders the housing of a device according to the invention. However, as soon as a vent opening has been melted, as far as possible no further heating energy should flow into the ice covering in the reducing agent tank. The ice covering in the reducing agent tank constitutes a very large heat sink in relation to the device for conveying liquid reducing agent. It is very expensive to heat the heat sink with electrical heating energy and the heating energy consumed in that case would then no longer be available at another point. For example, the heating energy consumed would then no longer be available at the connecting element and only inefficient heating of the connecting element for a reducing agent line would take place in the device according to the invention.

For this reason, it is particularly advantageous firstly to provide a heat bridge from the heat-conductive structure to the housing so that a vent opening can be melted in an ice covering. Secondly, however, a limit to the maximum heat flow from the heat-conductive structure to the housing is also provided so that no unnecessary energy loss occurs through this heat-conductive structure. Thus, in particular, only a single heat bridge is proposed which provides a targeted and limited heat quantity to create a vent opening in the ice covering close to (in the immediate vicinity of) the housing. This heat quantity is preferably also generated by the (single) system heating unit.

With the objects of the invention in view, there is concomitantly provided a motor vehicle, comprising an internal combustion engine, an exhaust gas treatment device for cleaning exhaust gasses from the internal combustion engine, the exhaust gas treatment device having a supply element for supplying reducing agent to the exhaust gas treatment device, a device according to the invention, and a reducing agent line connecting the device to the supply element. The device according to the invention conveys liquid reducing agent from a tank for the liquid reducing agent through the reducing agent line to the supply element.

Other features which are considered as characteristic for the invention are set forth in the appended claims, noting that the features listed individually in the dependent claims can be combined with each other in any arbitrary, technologically sensible manner and constitute further embodiments of the invention.

Although the invention is illustrated and described herein as embodied in a device for conveying liquid reducing agent, it is nevertheless not intended to be limited to the details shown, since various additional embodiments, modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
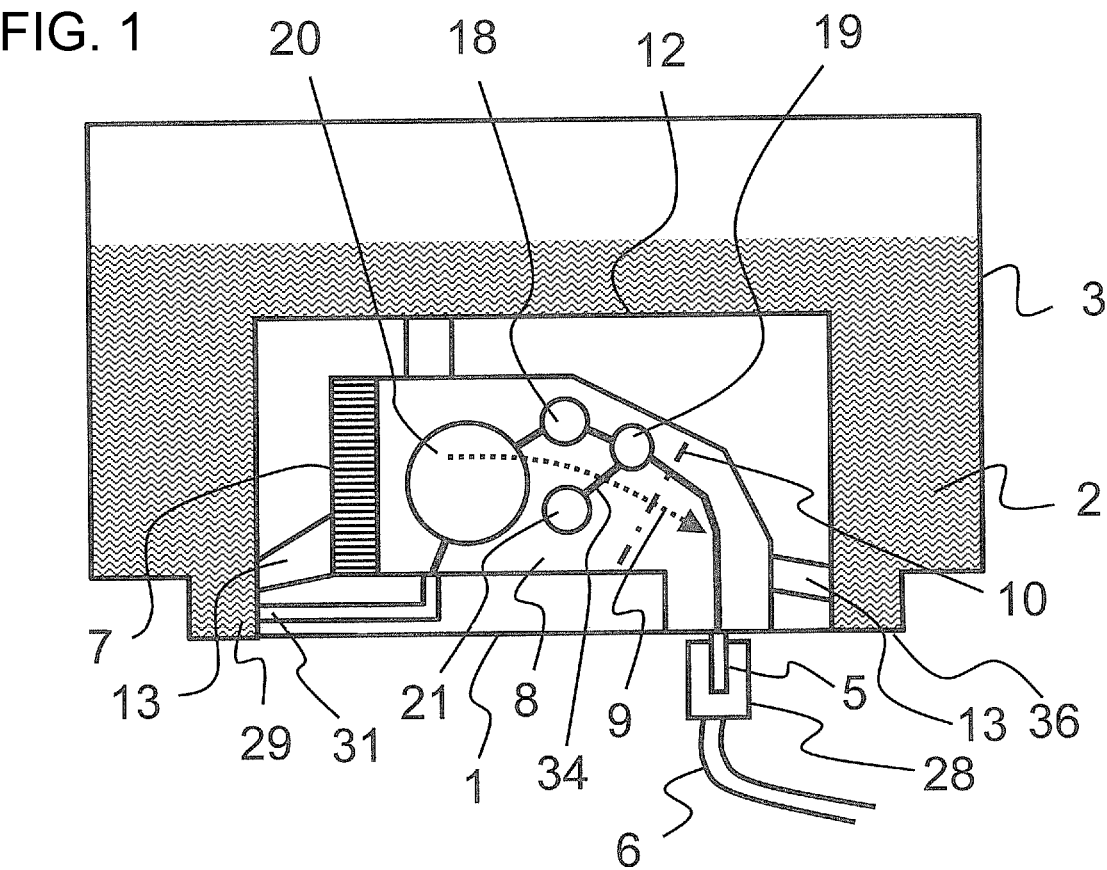
FIG. 1 is a diagrammatic, vertical-sectional view of a tank with a first embodiment variant of a device according to the invention.

Referring now to the figures of the drawings in detail and first, particularly, to FIG. 1 thereof, there is seen a tank 3 in which a device 1 according to the invention is installed on a bottom or floor 36. The device 1 is disposed on the bottom of the tank 3 in the region of a sump 29. The device 1 has an extraction point 31 through which liquid reducing agent 2 can be extracted from the tank 3 in the region of the sump 29.

A heat-conductive structure 8 is provided within the device 1. The heat-conductive structure 8 is constructed to transport thermal energy from a system heating unit 7 in a heat flow direction 9 to a connecting element 5. A reducing agent line 6 can be connected at the connecting element 5 for conveying reducing agent to a supply element, such as the supply element 4 shown in FIG. 5. This can be achieved by using a connecting plug 28 on the reducing agent line 6 which fits the connecting element 5. The heat-conductive structure 8 is formed in the manner of a metal block (in particular as one piece). Various components of the device 1 according to the invention are mounted on the heat-conductive structure 8. These include, for example, a filter 20, a pump 18, a return valve 19 and a sensor 21. The various components are connected together in the heat-conductive structure 8 through channels 34 integrated at least partly in the block. Thus, the heat-conductive structure 8 ensures an efficient heating of those components and the channels 34. The reducing agent 2 in the components and in the channels 34 is thus heated by the heat-conductive structure 8. The individual components partly also consume electrical energy, so that energy losses occur in the components as thermal energy which is at least partly introduced into the heat-conductive structure 8 and distributed efficiently by the heat-conductive structure 8.

The heat-conductive structure 8 has a decreasing, tapering cross section 10 in the heat flow direction 9 from the system heating unit 7 towards the connecting element 5. The device 1 also has a metal housing 12 which separates the device 1 from the tank 3. Thermal energy is transferred from the heat-conductive structure 8 to the housing 12 and hence also to the reducing agent 2 in the tank 3 through heat bridges 13 provided between the heat-conductive structure 8 and the housing 12.

Figure 2:
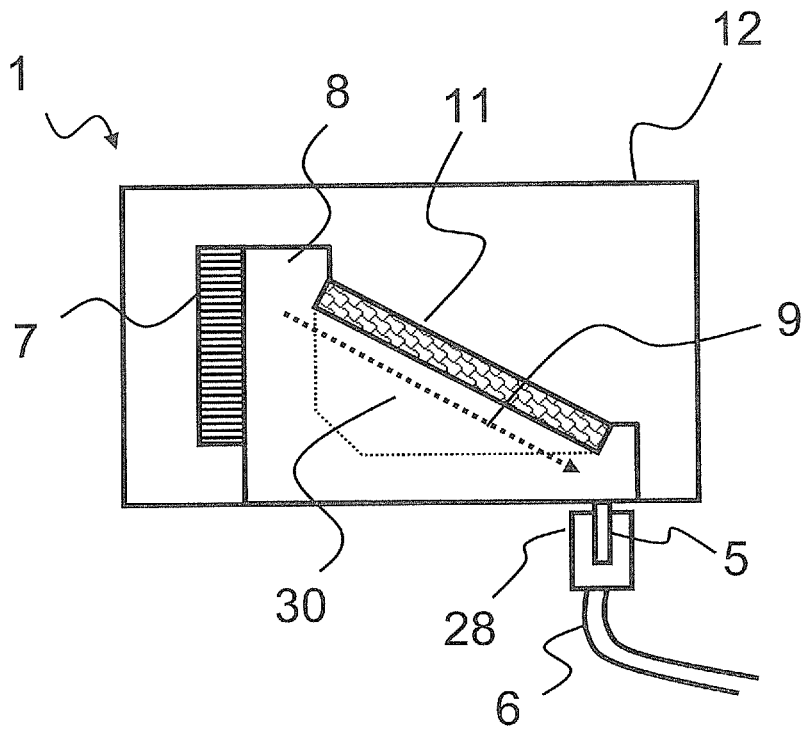
FIG. 2 is a vertical-sectional view of a second embodiment variant of the device according to the invention.

FIG. 2 shows a second embodiment variant of a device 1 according to the invention. This embodiment variant also includes a heat-conductive structure 8, a system heating unit 7 and a connecting element 5. A reducing agent line 6 can be connected to the connecting element 5 by a connecting plug 28. The heat-conductive structure 8 is also constructed as a metal block according to FIG. 2. However it has a constriction 30. The constriction 30 also constitutes a recess in the heat-conductive structure 8. The weight and the thermal capacity of the heat-conductive structure 8 are reduced by the constriction 30. At the same time, however, the thermal conductivity of the heat-conductive structure 8 from the system heating unit 7 to the connecting element 5 is reduced because the constriction 30 reduces the heat-conductive cross section of the heat-conductive structure 8. This is compensated for by providing a heat pipe 11 on the heat-conductive structure 8 for transporting heat in a heat flow direction 9 from the system heating unit 7 to the connecting element 5. The heat pipe 11 is preferably soldered or brazed onto or into the heat-conductive structure 8 in order to achieve a heat transfer which is as efficient as possible from the heat-conductive structure 8 to the heat pipe 11. In general any material-fit connection technique is suitable for connecting the heat-conductive structure 8 with the heat pipe 11. The device 1 according to FIG. 2 is also encapsulated and therefore also has a housing 12.

Figure 3:
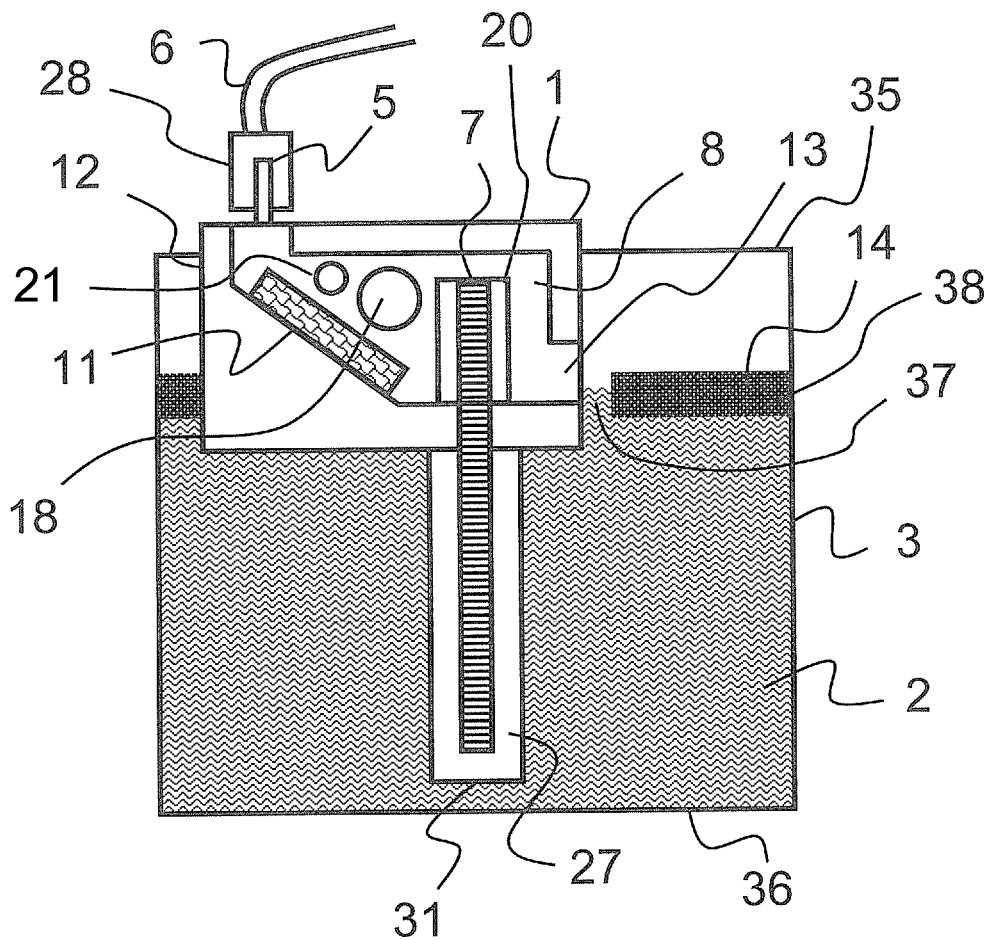
FIG. 3 is a vertical-sectional view of a tank with a third embodiment variant of a device according to the invention.

FIG. 3 shows a tank 3 with a further embodiment variant of a device 1 according to the invention. This device 1 according to the invention is mounted on a top 35 of the tank 3 and extends from the top 35 of the tank 3 down to the bottom 36 of the tank 3. In order to extract reducing agent 2 in the vicinity of the bottom 36, an extraction pipe 27 with an extraction point 31 disposed at the end is provided on the device 1 and extends over the height of the tank 3 from the top 35 to the bottom 36. The device 1 according to FIG. 3 also has a system heating unit 7, a heat-conductive structure 8 and a connecting element 5. A reducing agent line 6 can be attached to the connecting element 5 with a connecting plug 28. The heat-conductive structure 8 is adapted for transporting thermal energy from the system heating unit 7 to the connecting element 5.

The heat-conductive structure 8 according to the embodiment variant of FIG. 3 also includes a heat pipe 11. In this case, various components of the device 1 are mounted on the heat-conductive structure 8, as well. These include, for example, a filter 20, a pump 18 and a sensor 21. The system heating unit 7 in the embodiment variant shown in FIG. 3 is disposed at least partly inside the filter 20. The system heating unit 7 extends beyond the filter 20 into the extraction pipe 27 and is therefore able to melt a vent channel 37 through a covering 38 of frozen reducing agent 14 in the tank 3, irrespective of the height at which the covering 38 of frozen reducing agent 14 is present in the tank 3. The extraction pipe 27 is preferably also metallic. In order for a covering 38 of frozen reducing agent 14 to be melted efficiently when it is present at the height of the housing 12 of the device 1 according to the invention, heat bridges 13 are provided between the heat-conductive structure 8 and the housing 12.

Figure 4:
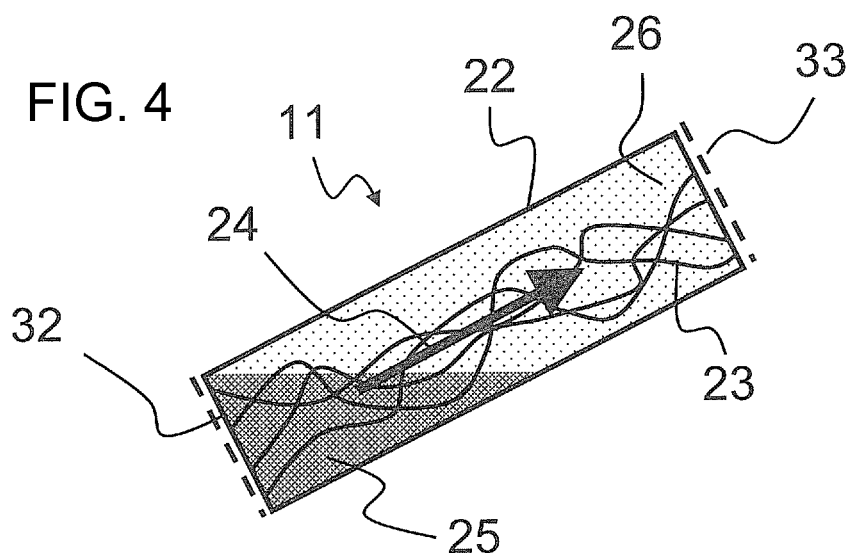
FIG. 4 is a longitudinal-sectional view of a heat pipe.

FIG. 4 illustrates the construction of a heat pipe 11. A heat pipe 11 has a preferably metallic pipe 22 as an outer shell. This pipe 22 is tightly sealed on both ends. Wicks 23 are disposed within the pipe 22. These wicks 23 extend from a heat absorption point 32 of the heat pipe 11 to a heat discharge point 33 of the heat pipe 11. Normally, liquid transport medium 25 is present at the heat absorption point 32 in the heat pipe 11. During the heat absorption, this liquid transport medium 25 evaporates and due to its increasing pressure reaches the heat discharge point 33. A typically gaseous transport medium 26, which is present at that location in the heat pipe 11, emits the heat stored therein by condensing. The condensed transport medium flows back to the heat absorption point 32 due to capillary forces along the wicks 23. In this way a continuous heat flow is established along a heat flow direction 24 from the heat absorption point 32 to the heat discharge point 33.

Figure 5:
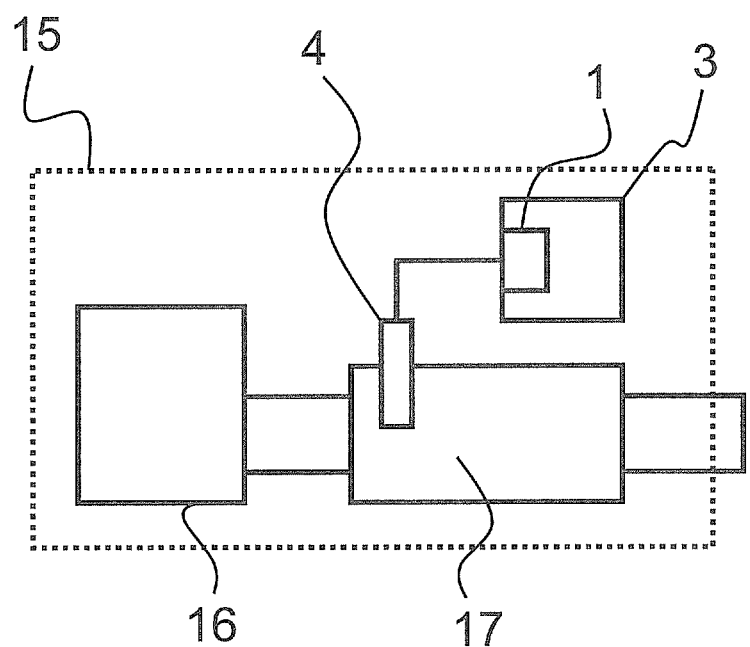
FIG. 5 is a longitudinal-sectional view of a motor vehicle including a device according to the invention.

FIG. 5 shows a motor vehicle 15 including an internal combustion engine 16 and an exhaust gas treatment device 17 for cleaning or purifying exhaust gasses of the internal combustion engine 16. The exhaust gas treatment device 17 includes a supply element 4 for the supply of liquid reducing agent. The supply element 4 is provided with reducing agent from a tank 3 by a device 1 according to the invention.

The device described herein according to the invention for conveying liquid reducing agent, at least partly solves the problems outlined in relation to the prior art. In particular, a device is indicated which can be started up particularly quickly and reliably when frozen reducing agent is present inside the device, and which at the same time is particularly economical e.g. since no additional electrical heating system is required.

The invention claimed is:

1. A device for conveying liquid reducing agent from a tank to a supply element, the device comprising:
    at least one connecting element configured to receive the liquid reducing agent from the tank and to provide a connection for a reducing agent line leading to the supply element;
    a system heating unit; and
    a heat-conductive structure being a metal block, said system heating unit being disposed at one end of said metal block and said connecting element being disposed at an opposite end of said metal block, at least one component disposed on said metal block between said system heating unit and said connecting element, said at least one component being a pump, a filter, or a valve, and said metal block being configured to transport heat from said system heating unit to said at least one connecting element.

2. The device according to claim 1, wherein said heat-conductive structure is configured to transport at least 20% of heating energy generated by said system heating unit to said at least one connecting element.

3. The device according to claim 1, wherein said heat-conductive structure has a thermal capacity of less than 500 J/K [Joules per Kelvin].

4. The device according to claim 1, wherein said heat-conductive structure has a thermal conductivity from said system heating unit to said at least one connecting element of more than 10 W/K [Watts per Kelvin].

5. The device according to claim 1, wherein the device has no further active heating system other than said system heating unit.

6. The device according to claim 1, wherein said heat-conductive structure defines a heat flow direction from said system heating unit to said at least one connecting element, and said heat-conductive structure has a continuously tapering cross section along said heat flow direction.

7. The device according to claim 1, wherein said heat-conductive structure includes at least one heat pipe.

8. The device according to claim 1, which further comprises:
    a housing; and
    at least one heat bridge placing said heat-conductive structure in heat-conductive connection with said housing;
    said at least one heat bridge configured to conduct a maximum heat flow between 5 W [Watts] and 50 W [Watts] from said heat-conductive structure to said housing when frozen reducing agent is present at said housing.

9. A motor vehicle, comprising:
an internal combustion engine;
an exhaust gas treatment device for cleaning exhaust gasses from said internal combustion engine, said exhaust gas treatment device having a supply element for supplying reducing agent to said exhaust gas treatment device;
a device according to claim 1; and
a reducing agent line connecting said device to said supply element.

* * * * *